July 26, 1932.  Z. O. ST. PALLEY  1,869,176
ELECTRICAL INDUCTION APPARATUS
Filed Feb. 2, 1931
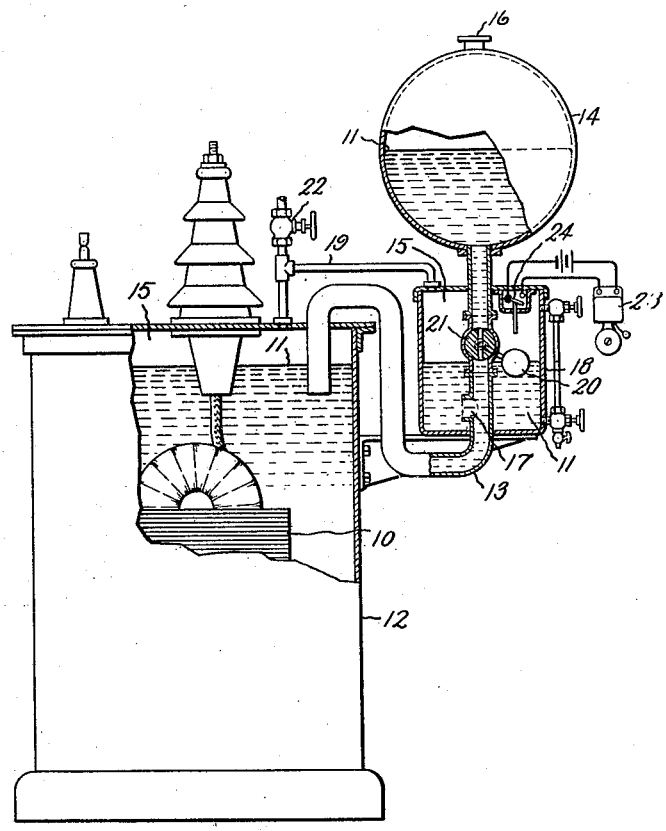
Inventor:
Zoltan O. St. Palley.
by Charles A. Mullen
His Attorney.

Patented July 26, 1932

1,869,176

UNITED STATES PATENT OFFICE

ZOLTAN O. ST. PALLEY, OF PITTSFIELD, MASSACHUSETTS, ASSIGNOR TO GENERAL ELECTRIC COMPANY, A CORPORATION OF NEW YORK

ELECTRICAL INDUCTION APPARATUS

Application filed February 2, 1931. Serial No. 512,997.

My invention relates to electrical induction apparatus and more particularly to apparatus such as a transformer or reactor which is immersed in an insulating liquid within a casing or tank. The temperature of the liquid varies considerably as the rate at which heat is produced in the apparatus changes with variations in load conditions. This causes a considerable expansion and contraction of the liquid which is usually provided for by an expansion chamber or conservator communicating with the main apparatus casing. It is sometimes desirable to have a small gas filled space above the liquid in the main casing to act as a cushion and help to absorb the initial shock in case of a sudden increase of pressure within the casing. An inert gas is usually used to avoid explosions and it is prevented from escaping by locating the inner end of the connection to the conservator below the surface of the liquid in the apparatus casing. It is preferable that the liquid extend from the apparatus casing into the conservator to a level higher than that in the main casing so that the pressure of the gas will be somewhat above the outside atmospheric pressure and no air can be drawn into the casing in the event of a leak. Any leakage, however, would permit the escape not only of the gas but the liquid in the conservator would run into and fill the main casing and then escape. The general object of the invention is to provide an arrangement which will prevent such escape of liquid.

The invention will be better understood from the following description taken in connection with the accompanying drawing which shows a conservator type transformer, partly in section, provided with an arrangement constructed in accordance with the invention to prevent escape of the liquid in the transformer casing and conservator.

The invention will be explained in connection with the transformer 10 shown in the drawing. This transformer is immersed in an insulating liquid 11 in a main casing 12, the insulating liquid extending through a pipe connection 13 into a conservator 14 which it partially fills. A body or cushion of inert gas 15 such as nitrogen above the surface of the liquid in the main casing 12 is provided to help absorb the initial shock due to any sudden increase of pressure in the casing. The end of the pipe connection 13 in the casing 12 is below the surface of the liquid 11 and the gas cushion 15 so that the gas 15 is confined above the liquid and cannot escape into the conservator. The conservator 14 is high enough so that the surface of the liquid 11 in it is above the level of the surface of the liquid in the main casing. The pressure of the gas 15 is therefore always higher than that of the outside air which is thus prevented from entering the casing 12 if a leak should develop.

The joints in the casing 12 and in and around its cover are normally tightly sealed to prevent any escape of the gas 15. A leak may develop, however, which will permit escape of the gas 15. As the gas escapes, it is replaced by liquid from the conservator 14 and if this is permitted to continue after all or most of the gas has escaped, then there will be an escape or leakage of liquid so long as it can be supplied from the conservator. This would be highly objectionable, not only because of the loss of liquid and the necessity of cleaning it up but the liquid which has generally been used has been a specially prepared mineral oil which is very inflammable.

If a leak develops at the top of the casing 12 so that the gas escapes, the surface of the liquid 11 in the casing will rise as the escaping gas is replaced by liquid from the conservator 14. The conservator is provided with a breather or vent 16 so that atmospheric pressure is maintained above the liquid 11 in the conservator as the level of this liquid rises or falls. The pipe connection 13 has an opening 17 communicating with a chamber or compartment 18 into which the liquid 11 extends. The portions of the liquid 11 in the main casing 12, pipe connection 13, chamber 18 and conservator 14 are thus all in communication with each other. The space above the liquid in the chamber 18 is in communication through a pipe connection 19 with the gas filled space above the liquid in the main casing 12 so that both spaces are filled with the gas 15 and the pressures of the gas 15 and therefore the levels of the liquid 11 in both spaces are always equal.

As the level of the liquid 11 rises when a leak occurs in the casing 12, a float 20 resting on the liquid in the chamber 18 is forced upwardly. This float 20 controls a valve 21 in the pipe connection 13, the valve being held open when the level of the liquid 11 is normal and being closed by the float as the level of the liquid rises. The closing of the valve preferably occurs just before the liquid has reached any of the joints in and around the cover of the casing 12 where any leak is most apt to occur. After the valve 21 has been closed by the float 20 in response to this predetermined level of the liquid 11, no more liquid can reach the casing 12 from the conservator 14 and so none can leak out of the casing. The float chamber 18 is preferably outside the main casing 12 as shown in the drawing where it is easily accessible and it may surround the part of the pipe connection 13 which contains the valve 21. The gas 15 may be forced into the casing 12 and chamber 18 through a valve 22. An alarm 23 may be arranged to give a signal when the valve 21 is closed or nearly closed and thus to serve as a warning that there is a leakage of the gas 15. The alarm 23 is shown in the drawing as being controlled by a contact 24 having a pin projecting into the path of the float 20 which will raise the pin and close the contact at the proper predetermined position of the valve 21.

The invention has been explained by illustrating and describing a particular form and application thereof but it will be obvious that changes may be made without departing from the spirit of the invention and the scope of the appended claims.

What I claim as new and desire to secure by Letters Patent of the United States, is:

1. The combination with electrical apparatus immersed in a liquid within a casing, and a gas cushion above the liquid in said casing, of a conservator partially filled with liquid and communicating with the liquid in said casing below said gas cushion, a compartment partially filled with liquid communicating with the liquid in the casing, the space above the liquid in said compartment being filled with gas communicating with said gas cushion, whereby the level of the liquid in said compartment is always the same as that of the liquid in said casing, a float on the liquid in said compartment, and means controlled by said float for preventing liquid from the conservator from entering said casing after the liquid in the casing and compartment has risen to a predetermined level.

2. The combination with electrical apparatus immersed in a liquid within a casing, and a gas cushion above the liquid in said casing, of a conservator partially filled with liquid, a pipe connection between the liquid in the conservator and the liquid in said casing below the gas cushion, a compartment partially filled with liquid and surrounding said pipe connection, the liquid in said compartment communicating with the liquid in said casing and the space above the liquid in said compartment being filled with gas and communicating with said gas cushion, a valve in the portion of said pipe connection within said compartment, and a float on the liquid in said compartment, said float being connected to close said valve to prevent liquid from the conservator from entering said casing after the liquid in the casing has risen to a predetermined level.

In witness whereof, I have hereunto set my hand.

ZOLTAN O. ST. PALLEY.